United States Patent
Chu et al.

(10) Patent No.: US 12,360,195 B2
(45) Date of Patent: Jul. 15, 2025

(54) METHOD AND SYSTEM FOR WIRELESS POSITIONING

(71) Applicant: Wistron Corporation, New Taipei (TW)

(72) Inventors: Kuo-Chung Chu, New Taipei (TW); Chien-Ming Chu, New Taipei (TW)

(73) Assignee: Wistron Corporation, New Taipei (TW)

(*) Notice: Subject to any disclaimer, the term of this patent is extended or adjusted under 35 U.S.C. 154(b) by 339 days.

(21) Appl. No.: 18/164,609

(22) Filed: Feb. 5, 2023

(65) Prior Publication Data

US 2024/0142563 A1 May 2, 2024

(30) Foreign Application Priority Data

Oct. 27, 2022 (TW) .................................. 111140967

(51) Int. Cl.
| | | |
|---|---|---|
| G01S 19/44 | (2010.01) | |
| G01S 5/00 | (2006.01) | |
| G01S 5/02 | (2010.01) | |
| G01S 5/04 | (2006.01) | |
| G01S 5/14 | (2006.01) | |
| G01S 19/37 | (2010.01) | |

(52) U.S. Cl.
CPC ........ *G01S 5/02585* (2020.05); *G01S 5/0036* (2013.01); *G01S 5/04* (2013.01); *G01S 5/14* (2013.01); *G01S 2205/02* (2020.05)

(58) Field of Classification Search
CPC .................................. G01S 19/44; G01S 19/37
USPC .................................................. 342/357.27
See application file for complete search history.

(56) References Cited

U.S. PATENT DOCUMENTS

| | | | |
|---|---|---|---|
| 2016/0066157 A1 | 3/2016 | Noorshams et al. | |
| 2017/0171833 A1 | 6/2017 | Vamaraju et al. | |
| 2020/0271747 A1 | 8/2020 | Wu et al. | |

FOREIGN PATENT DOCUMENTS

| | | | | |
|---|---|---|---|---|
| CN | 107402374 A | * | 11/2017 | ........... G01C 21/165 |
| CN | 107607110 A | * | 1/2018 | |
| CN | 110267342 A | * | 9/2019 | ........... G01S 5/0278 |

OTHER PUBLICATIONS

"Office Action of Taiwan Counterpart Application", issued on May 12, 2023, p. 1-p. 25.

* cited by examiner

*Primary Examiner* — Harry K Liu

(74) *Attorney, Agent, or Firm* — JCIPRNET

(57) ABSTRACT

A method and a system for wireless positioning are provided. Multiple received signal strengths corresponding to multiple wireless access points are measured by a user device. The received signal strengths include multiple first received signal strengths. A reference positioning position is obtained according to positioning reference information provided by the user device. A first positioning position based on the first received signal strengths is obtained. The reference positioning position is compared with the first positioning position. In response to the distance between the reference positioning position and the first positioning position being greater than a tolerance value, at least one of the first received signal strengths is excluded from the multiple received signal strengths, so as to obtain multiple filtered received signal strengths. A user position of the user device is obtained according to the filtered received signal strengths.

16 Claims, 12 Drawing Sheets

METHOD AND SYSTEM FOR WIRELESS POSITIONING

CROSS-REFERENCE TO RELATED APPLICATION

This application claims the priority benefit of Taiwan application serial no. 111140967, filed on Oct. 27, 2022. The entirety of the above-mentioned patent application is hereby incorporated by reference herein and made a part of this specification.

BACKGROUND

Technical Field

The disclosure relates to a positioning technology, and in particular, to a method and a system for wireless positioning.

Description of Related Art

Applications related to indoor positioning have become more and more extensive, so the technology of indoor positioning has received lots of attention. For example, the indoor positioning may be used to control personnel in specific areas. Accordingly, the accuracy of indoor positioning is very important for its related applications. Inaccurate indoor positioning results may cause the related applications to function improperly. Currently, many indoor positioning methods determine the position of a user device according to a received signal strength indication (RSSI) value measured by the user device.

Specifically, the user device may receive wireless signals from multiple wireless access points (APs) and measure RSSI values of the wireless signals. The transmission distance of a wireless signal is different, so signal attenuation in different degrees may occur. In an indoor environment, the transmission of wireless signals is prone to be blocked by obstacles or there are multiple transmission paths, resulting in a non-linear relationship of the estimated distance between the RSSI value of the wireless signal and the wireless access points of the user device, which leads to poor accuracy of indoor positioning results.

SUMMARY

In view of this, embodiments of the disclosure provide a method and a system for wireless positioning, capable of improving the accuracy of wireless positioning.

The method for wireless positioning according to an embodiment of the disclosure includes (but is not limited to) the following steps. Multiple received signal strengths corresponding to multiple wireless access points are measured by a user device. The multiple received signal strengths include multiple first received signal strengths. A reference positioning position is obtained according to the positioning reference information provided by the user device. A first positioning position is obtained based on the multiple first received signal strengths. The reference positioning position is compared with the first positioning position. In response to a distance between the reference positioning position and the first positioning position being greater than a tolerance value, at least one of the multiple first received signal strengths is excluded from the multiple received signal strengths for obtaining multiple filtered received signal strengths in the multiple received signal strengths. A user position of the user device is obtained according to the multiple filtered received signal strengths.

The system for wireless positioning according to an embodiment of the disclosure includes (but is not limited to) a user device, a geolocation server, and a server device. The user device is configured to measure multiple received signal strengths corresponding to multiple wireless access points, respectively. The multiple received signal strengths include multiple first received signal strengths. The server device connects the user device and the geolocation server. The server device obtains a reference positioning position according to positioning reference information provided by the user device and obtains a first positioning position based on the multiple first received signal strengths. The server device compares the reference positioning position with the first positioning position, and in response to a distance between the reference positioning position and the first positioning position being greater than a tolerance value, excludes at least one of the multiple first received signal strengths from the multiple received signal strengths for obtaining multiple filtered received signal strengths in the multiple received signal strengths. The server device obtains a user position of the user device according to the multiple filtered received signal strengths through the geolocation server.

In summary, in the embodiments of the disclosure, the user device measures the received signal strengths corresponding to the wireless access points, respectively. Whether the received signal strengths are reliable may be verified according to the positioning reference information provided by the user device, and then unreliable received signal strengths are excluded to obtain filtered received signal strengths. Accordingly, the user position of the user device may be generated according to the reliable filtered received signal strengths, thereby greatly improving the positioning accuracy.

In order to make the features and advantages of the disclosure comprehensible, embodiments accompanied with drawings are described in detail below.

DESCRIPTION OF THE EMBODIMENTS

Figure 1:
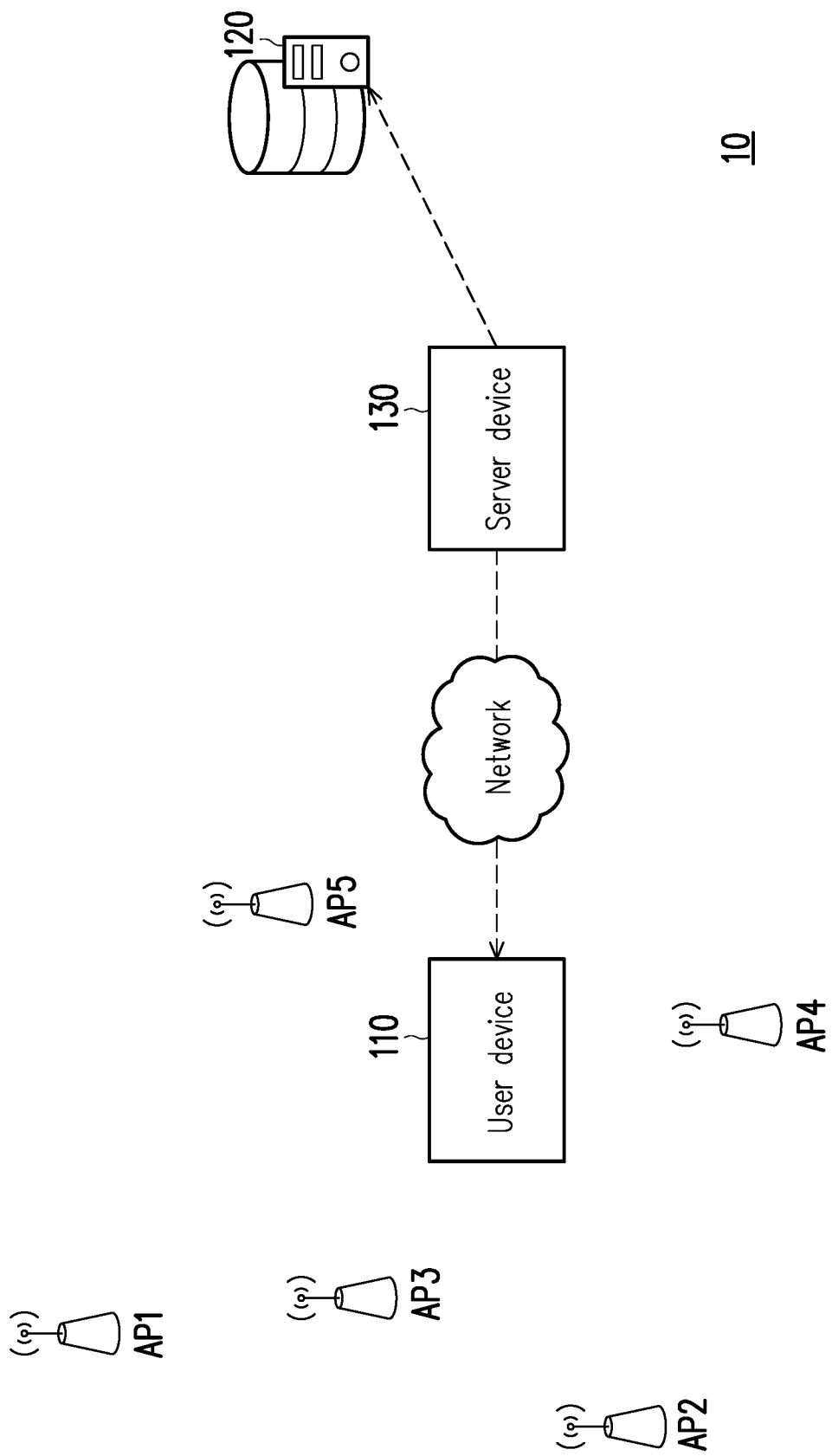
FIG. 1 is a schematic view of a system for wireless positioning according to an embodiment of the disclosure.

Some embodiments of the disclosure will be described in detail with reference to the accompanying drawings. For reference numerals cited in the following descriptions, the same reference numerals appearing in different drawings are regarded as the same or similar elements. The embodiments are only a part of the disclosure and do not disclose all possible implementations of the disclosure. More precisely, the embodiments are merely examples of the device and the method.

In addition, the terms "first", "second", and so on used in this specification (including claims) are used to name the elements or distinguish different embodiments or ranges from each other, and should not be construed as the upper limit or lower limit of the number of the elements or as a limitation to the order of the elements.

FIG. 1 is a schematic view of a system for wireless positioning according to an embodiment of the disclosure. Referring to FIG. 1, a system 10 for wireless positioning includes (but is not limited to) a user device 110, a geolocation server 120, and a server device 130.

The user device 110 may be a portable mobile electronic device such as a smart phone, a tablet computer, or a wearable device. The user device 110 includes an antenna and a transceiver for receiving wireless signals. The transceiver may perform operations such as low noise amplification, impedance matching, frequency mixing, up and down frequency conversion, filtering, amplification, and/or the like. The user device 110 may measure multiple received signal strengths corresponding to multiple wireless access points AP1-AP5, respectively. The wireless access points AP1-AP5 are, for example, WiFi access points or wireless access points supporting other wireless communication standards. More specifically, the user device 110 may receive wireless signals from the wireless access points AP1-AP5 and measure the received signal strengths of the wireless signals. In one embodiment, the received signal strength includes a received signal strength indication (RSSI) value. Noted that the quantity of the wireless access points AP1-AP5 in FIG. 1 is only used for illustration and may be changed according to actual application scenarios.

In addition, note that the user device 110 may collect position information about its own position and provide the server device 130 with the position information for positioning, and the positioning result from the server device 130 is obtained. The position information may include GPS position information, WiFi-related information, mobile communication base station information, inertial sensing information, environmental sensing information, Bluetooth-related information, or position information related to various other communication standards, and the like.

The geolocation server 120 records the geographic coordinates and MAC addresses of the wireless access points AP1-AP5. The geolocation server 120 may calculate the geographic coordinates of the user device 110 according to the received signal strength measured by the user device 110 and the geographic coordinates of the wireless access points AP1-AP5. For example, the geolocation server 120 may estimate the geographical coordinates of the user device 110 according to a triangulation method. The geolocation server 120 may provide an application programming interface to allow an external device to provide the received signal strengths corresponding to the wireless access points AP1-AP5 so that the external device receives the geographic coordinates of the user device 110. For example, the geolocation server 120 may be a server operated by Google Corporation.

The server device 130 may connect the user device 110 and the geolocation server 120 via a communication network (e.g., the Internet, a local area network, or a private network). The server device 130 may be implemented by a single server or implemented by multiple individual servers with different functions and capable of communicating with each other, which is not limited in the disclosure. The server device 130 may include a number of separate elements including, but not limited to, a processor and memory for carrying executable instructions. The server device 130 used to define the functions of the server device 130 may be executed by a processor. The server device 130 may also include communication elements that allow the server device 130 to communicate over the communication network.

In the subsequent paragraphs, the method for wireless positioning according to the embodiment of the disclosure is illustrated with reference to various devices in the system 10 for wireless positioning. Each step in the flow of the method may be adjusted according to the implementation situation, which the disclosure is not limited thereto.

Figure 2:
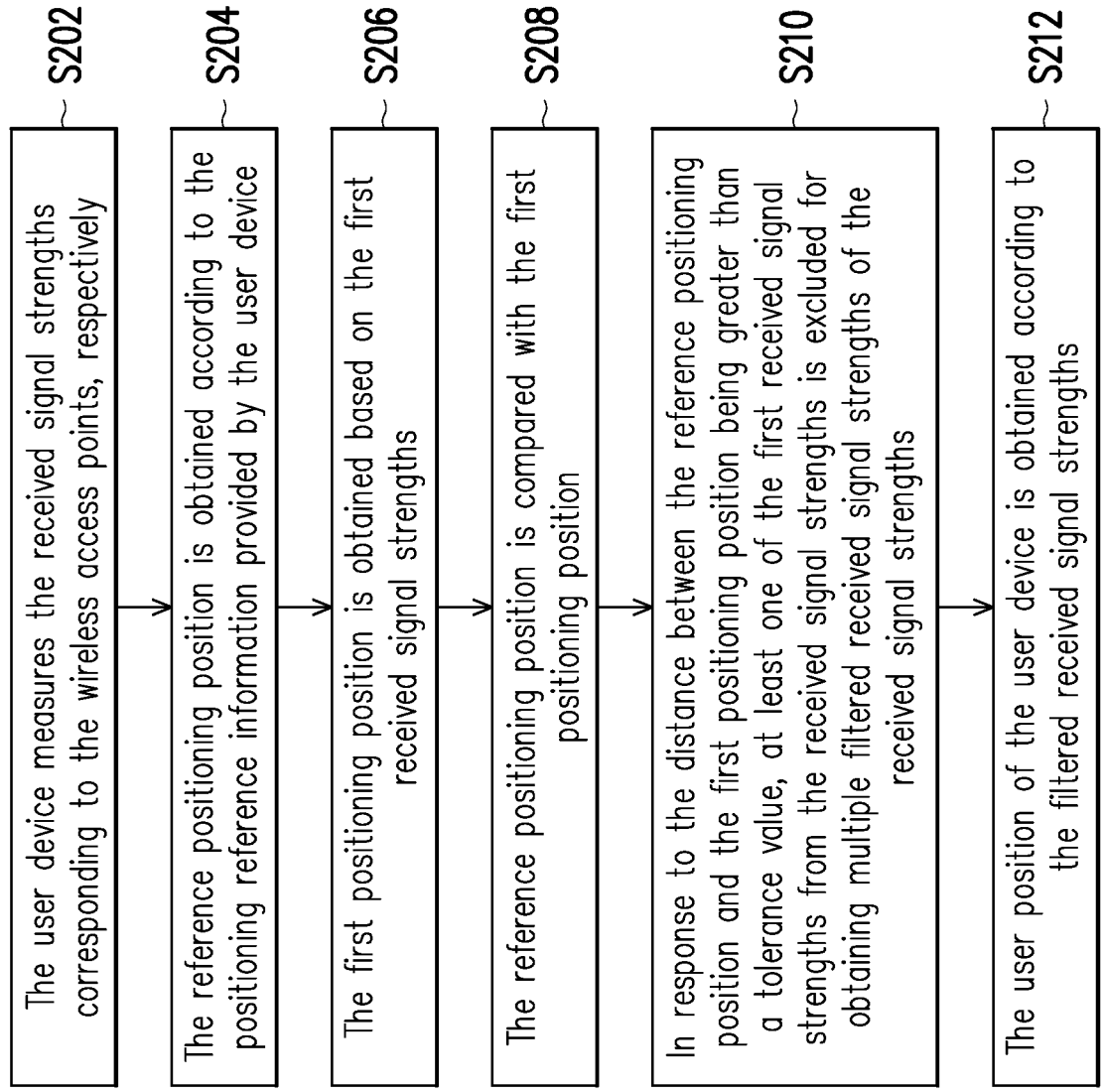
FIG. 2 is a flowchart of a method for wireless positioning according to an embodiment of the disclosure.

FIG. 2 is a flowchart of a method for wireless positioning according to an embodiment of the disclosure. Referring to FIG. 1 and FIG. 2, in step S202, the user device 110 measures the received signal strengths corresponding to the wireless access points AP1-AP5, respectively. In one embodiment, the user device 110 may receive wireless signals sent by the wireless access points AP1-AP5, such as WiFi signals, but the disclosure is not limited thereto. The user device 110 may measure the received signal strengths of the wireless signals sent by the wireless access points AP1-AP5. In addition, through the transmission of wireless signals, the user device 110 may obtain the respective MAC addresses of the wireless access points AP1-AP5. In the embodiment of FIG. 1, the user device 110 may receive wireless signals from five wireless access points AP1-AP5, so the user device 110 may measure the five received signal strengths correspondingly. The user device 110 may upload the MAC addresses of the wireless access points AP1-AP5 and the corresponding received signal strengths to the server device 130.

In step S204, the server device 130 obtains the reference positioning position according to the positioning reference information provided by the user device 110. Specifically, the user device 110 may transmit the positioning reference information to the server device 130. The positioning reference information is related information for generating the reference positioning position of the user device 110. Note that the positioning reference information is information not related to the wireless access points AP1-AP5, that is, the positioning reference information is different from the received signal strengths corresponding to the wireless access points AP1-AP5. For example, when the wireless access points AP1-AP5 are WiFi access points, the positioning reference information may include GPS position information, mobile communication base station information, inertial sensing information, environmental sensing information, or Bluetooth-related information, and so on. The server device 130 may calculate the reference positioning position of the user device 110 according to the positioning reference information provided by the user device 110.

In step S206, the server device 130 obtains the first positioning position based on the multiple first received signal strengths. Specifically, the server device 130 may receive the MAC addresses of the wireless access points AP1-AP5 and the corresponding received signal strengths from the user device 110. Herein, the multiple received signal strengths include multiple first received signal strengths. Specifically, the first received signal strengths are defined as some of the received signal strengths, and the first received signal strengths are used to generate the first positioning position. The server device 130 may transmit some of the received signal strengths (i.e., the multiple first received signal strengths) and the corresponding MAC addresses to the geolocation server 120. The geolocation server 120 may perform triangulation according to the geographical coordinates corresponding to the MAC addresses and the multiple first received signal strengths to obtain the first positioning position based on the multiple first received signal strengths. Thus, the server device 130 may receive the first positioning position based on the multiple first received signal strengths from the geolocation server 120.

In step S208, the server device 130 compares the reference positioning position with the first positioning position. Specifically, the server device 130 may calculate the distance between the reference positioning position and the first positioning position. In addition, the server device 130 may determine whether the distance between the reference positioning position and the first positioning position is greater than a tolerance value. The tolerance value may be a distance threshold, which designed according to practical applications, which is not limited in the disclosure.

In step S210, in response to the distance between the reference positioning position and the first positioning position being greater than the tolerance value, the server device 130 excludes at least one of the multiple first received signal strengths from the multiple received signal strengths for obtaining multiple filtered received signal strengths of the received signal strengths. Specifically, by comparing the reference positioning position with the first positioning position, the server device 130 may verify the reliability of the first received signal strength generating the first positioning position. If the distance between the reference positioning position and the first positioning position is greater than the tolerance value, it means that the multiple first received signal strengths for generating the first positioning position include unreliable data. Accordingly, if the distance between the reference positioning position and the first positioning position is greater than the tolerance value, the server device 130 may exclude one or more first received signal strengths from the multiple received signal strengths, thereby filtering out unreliable data.

In addition, in one embodiment, in response to the distance between the reference positioning position and the first positioning position is less than the tolerance value, the server device 130 records the multiple first received signal strengths into a reliable list. The reliable list is used to record the filtered received signal strength.

Figure 3:
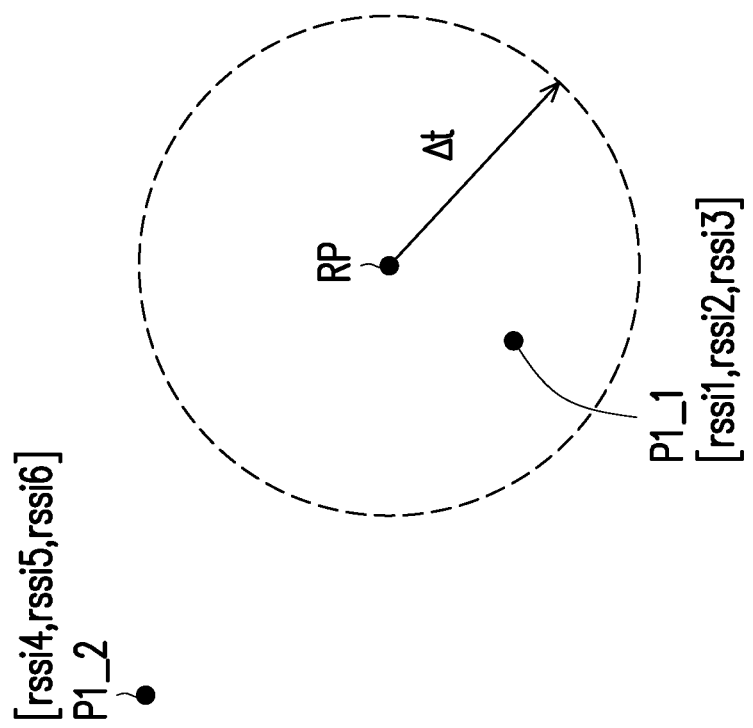
FIG. 3 is a schematic view of comparing a reference positioning position and a first positioning position according to an embodiment of the disclosure.

FIG. 3 is a schematic view of comparing the reference positioning position and the first positioning position according to an embodiment of the disclosure. Referring to FIG. 3, assuming that a first positioning position P1_1 is generated according to three first received signal strengths [rssi1, rssi2, rssi3], and a first positioning position P1_2 is generated according to the three first received signal strengths [rssi4, rssi5, rssi6], the server device 130 may compare a reference positioning position RP and the first positioning position P1_1 and determine that the distance between the reference positioning position RP and the first positioning position P1_1 is less than a tolerance value Δt. Therefore, the server device 130 may determine that the first received signal strengths [rssi1, rssi2, rssi3] are reliable data, and the first received signal strengths [rssi1, rssi2, rssi3] are kept, that is, the first received signal strengths [rssi1, rssi2, rssi3] are recorded in the reliable list. On the other hand, the server device 130 may compare the reference positioning position RP and the first positioning position P1_2 and determine that the distance between the reference positioning position RP and the first positioning position P1_2 is greater than the tolerance value Δt. Therefore, the server device 130 may determine that the first received signal strengths [rssi4, rssi5, rssi6] include unreliable data and exclude all or some of the first received signal strengths [rssi4, rssi5, rssi6].

In addition, in one embodiment, in response to the distance between the reference positioning position and the first positioning position being greater than the tolerance value, the server device 130 may record multiple first received signal strengths into the unreliable list. The server device 130 may obtain multiple third received signal strengths from the reliable list and obtain the second positioning position according to one of the multiple third received signal strengths and the multiple first received signal strengths in the unreliable list. As illustrated in FIG. 3, the server device 130 may obtain multiple third received signal strengths [rssi1, rssi2] from the reliable list and obtain the second positioning position according to multiple third received signal strengths [rssi1, rssi2] and the first received signal strength [rssi4] in the unreliable list.

In response to the distance between the reference positioning position and the second positioning position being greater than the tolerance value, the server device 130 may keep one of the multiple first received signal strengths in the unreliable list for excluding one of the first received signal strengths from the multiple received signal strengths. In response to the distance between the reference positioning position and the second positioning position being less than the tolerance value, the server device 130 may change one of the multiple first received signal strengths from being recorded in the unreliable list to being recorded in the reliable list. With reference to the embodiment of FIG. 3, if the distance between the second positioning position and the reference positioning position obtained according to the third received signal strengths [rssi1, rssi2] and the first received signal strength [rssi4] is less than the tolerance value, the server device 130 may change the first received signal strength [rssi4] from being recorded in the unreliable list to being recorded in the reliable list. Conversely, if the distance between the second positioning position and the reference positioning position obtained according to the third received signal strengths [rssi1, rssi2] and the first received signal strength [rssi4] is greater than the tolerance value, the server device 130 may keep the first received signal strength [rssi4] in the unreliable list.

In step S212, the server device 130 obtains the user position of the user device 110 according to the multiple filtered received signal strengths. Specifically, the server device 130 may transmit the filtered received signal strengths and corresponding MAC addresses to the geolocation server 120. The geolocation server 120 may perform triangulation according to the geographic coordinates corresponding to the MAC addresses and the multiple filtered received signal strengths to determine the user position. Thus, the server device 130 may receive the user position from the geolocation server 120 and may provide the user device 110 with the user position. Accordingly, the user position is determined based on the verified filtered received signal strength, which may improve the positioning accuracy.

Figure 4:
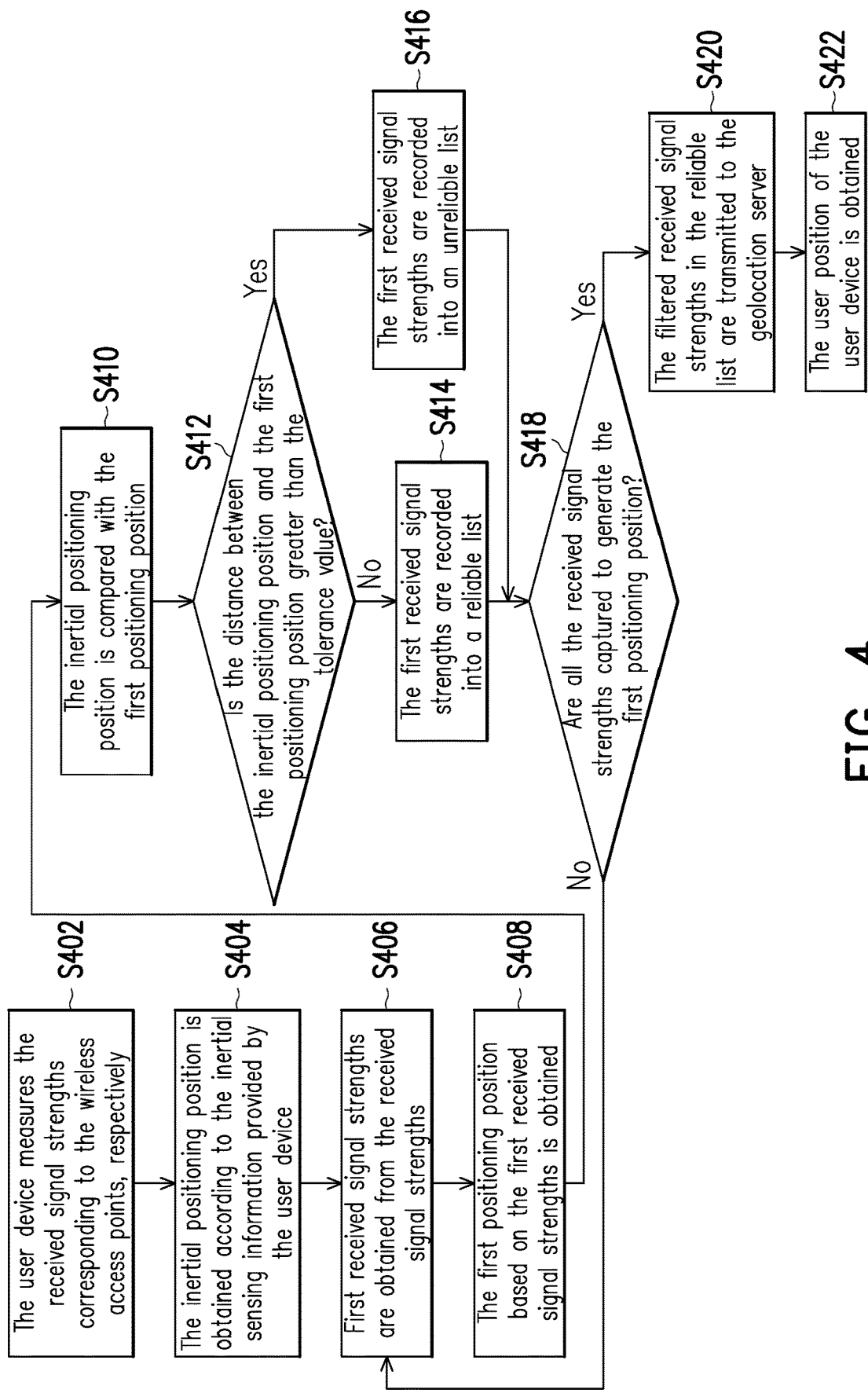
FIG. 4 is a flowchart of a method for wireless positioning according to an embodiment of the disclosure.

FIG. 4 is a flowchart of a method for wireless positioning according to an embodiment of the disclosure. Referring to FIG. 4, in the embodiment of FIG. 4, the positioning reference information includes inertial sensing information and the reference positioning position is the inertial positioning position for further illustration.

In step S402, the user device 110 measures the received signal strengths corresponding to the wireless access points, respectively. In step S404, the server device 130 obtains the inertial positioning position according to the inertial sensing information provided by the user device 110. In one embodiment, the inertial sensing information is sensed by the user device 110. The server device 130 may perform inertial positioning according to the inertial sensing information and the initial position of the user device 110 to obtain the inertial positioning position. The server device 130 may obtain the moving direction and the moving distance of the user device 110 according to the inertial sensing information, and the inertial positioning position is calculated based on the initial position and the moving information.

Specifically, the user device 110 may include an inertial sensor (not shown). In one embodiment, the inertial sensor may include an acceleration sensor and a gyroscope. Correspondingly, the inertial sensing information may include sensing data of the acceleration sensor and sensing data of the gyroscope. The user device 110 may transmit the sensing data of the acceleration sensor and the sensing data of the gyroscope to the server device 130, so that the server device 130 may calculate the current inertial positioning position accordingly. For example, the server device 130 may generate the inertial positioning position according to the following formula (1) and formula (2).

$$Xi1=Xi0+SN \times L \times \cos(A) \quad \text{Formula (1)}$$

$$Yi1=Yi0+SN \times L \times \sin(A) \quad \text{Formula (2)}$$

SN is the number of walking steps sensed by the acceleration sensor; L is the step length; A is the moving direction sensed by the gyroscope; (Xi1, Yi1) is the inertial positioning position generated by inertial positioning; (Xi0, Yi0) is the initial position.

In one embodiment, the initial position may be a previous user position generated by the geolocation server 120 at a previous time point. In the embodiment of the disclosure, the positioning operation process of the user device 110 may be continuously repeated over time. Under this premise, the initial position may be generated according to the filtered received signal strength corresponding to the previous time point. Note that, in the case where the server device 130 has not yet determined the filtered received signal strength, the initial position may be generated according to the unfiltered received signal strength corresponding to the previous time point. More specifically, when the inertial positioning is performed for the first time, the server device 130 may generate the initial position according to the original received signal strength through the geolocation server 120.

In step S406, the server device 130 obtains multiple first received signal strengths from the multiple received signal strengths. Specifically, in one embodiment, the server device 130 may obtain N first received signal strengths from M received signal strengths, where M and N are positive integers and M is greater than N. For example, the server device 130 may obtain three first received signal strengths from the M received signal strengths, but the disclosure is not limited thereto. Specifically, in one embodiment, the server device 130 may obtain some of the received signal strength each time to perform reliability verification.

In step S408, the server device 130 obtains the first positioning position based on the multiple first received signal strengths. In step S410, the server device 130 compares the inertial positioning position with the first positioning position. In step S412, the server device 130 determines whether the distance between the inertial positioning position and the first positioning position is greater than the tolerance value. The detailed implementations of steps S408 to S412 have been illustrate, which is not repeated herein.

If it is determined "Yes" in step S412, proceed to step S414. In step S414, in response to the distance between the inertial positioning position and the first positioning position being less than the tolerance value, the server device 130 records the multiple first received signal strengths into the reliable list. If it is determined "No" in step S412, proceed to step S416. In step S416, in response to the distance between the inertial positioning position and the first positioning position being greater than the tolerance value, the server device 130 records the first received signal strengths into the unreliable list. In the embodiment, the multiple first received signal strengths recorded in the unreliable list may be directly excluded from the initial multiple received signal strengths.

In step S418, the server device 130 determines whether all the received signal strengths are captured to generate the first positioning position. Specifically, the server device 130 determines whether all the received signal strengths provided by the user device 110 are verified according to the inertial positioning position.

If it is determined as "No" in step S418, return to step S406. That is, the server device 130 may capture other multiple first received signal strengths to generate another first positioning position for verification. If it is determined as "Yes" in step S418, proceed to step S420. In step S420, the server device 130 transmits the filtered received signal strengths in the reliable list to the geolocation server 120. The geolocation server 120 may obtain multiple geographic coordinates according to the MAC addresses corresponding to the filtered received signal strengths and calculate the user position according to the geographic coordinates and the filtered received signal strengths. In step S422, the server device 130 may obtain the user position of the user device 110 from the geolocation server 120.

Note that if the initial position for generating the inertial positioning position is not ideal, there may also generate huge errors in the inertial positioning position. In this case, each first positioning position generated according to each set of the first received signal strengths may be far away from the inertial positioning position, and all received signal strengths provided by the user device 110 are excluded. That is, if the initial position for generating the inertial positioning position is too different from the actual position of the user device 110, the reliable list may not include any filtered received signal strengths. Therefore, in some embodiments, the server device 130 may use the first positioning position as the user position of the user device 110 in response to all of the multiple received signal strengths being excluded based on the inertial positioning position. That is, when all the multiple received signal strengths are excluded based on the inertial positioning position, the server device 130 may abandon the filtering operation on the multiple received signal strengths and obtain the first positioning position generated according to the unfiltered received signal strengths to serve as the user position of the user device 110.

Figure 5:
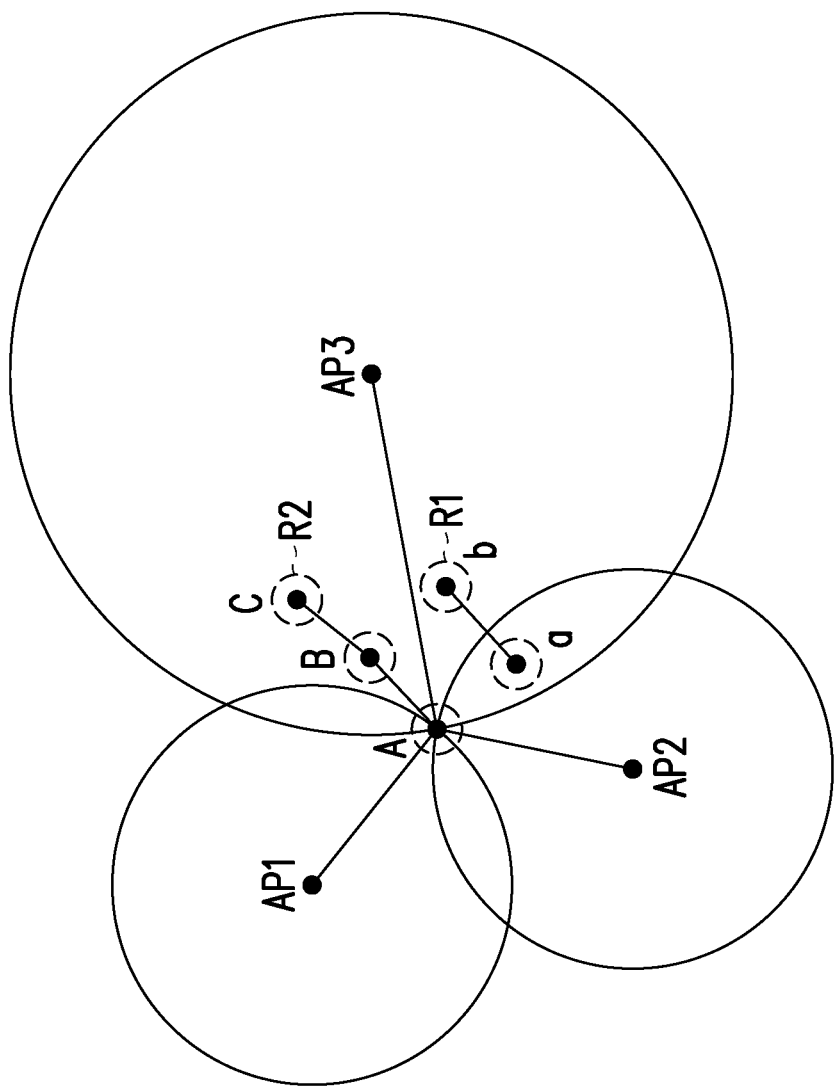
FIG. 5 is a schematic view of an exceptional incidence when inertial sensing information of a method for wireless positioning is used according to an embodiment of the disclosure.

FIG. 5 is a schematic view of an exceptional incidence when inertial sensing information of a method for wireless positioning is used according to an embodiment of the disclosure. Referring to FIG. 5, assuming that the user is actually located at a coordinate position A, but currently the initial position obtained by the server device 130 for calculating the inertial positioning position is a coordinate position a, based on the detailed operation of the inertial navigation, the server device 130 may estimate the inertial positioning position as a coordinate position b according to the coordinate position a and the moving information. Meanwhile, the server device 130 may obtain the first positioning position as a coordinate position B through the geolocation server 120. As shown in FIG. 5, the coordinate position B may not be within the allowable range R1 based on the coordinate position b. When all the first positioning positions generated by the geolocation server 120 according to each set of the first received signal strengths are not within the allowable range R1, the server device 130 may abandon the filtering operation on the multiple received signal strengths, and the coordinate position B is used to serve as the user position. Next, the coordinate position B may be used as the initial position for inertial positioning at the next time point, and the inertial positioning position is obtained as the coordinate position C. Accordingly, even if the initial position of the inertial navigation positioning is wrong, the server device 130 according to the embodiment of the disclosure still has an appropriate processing mechanism. In addition, since the initial position of the inertial positioning is provided by the geolocation server 120 each time, the error accumulation of the inertial positioning may not occur.

Figure 6:
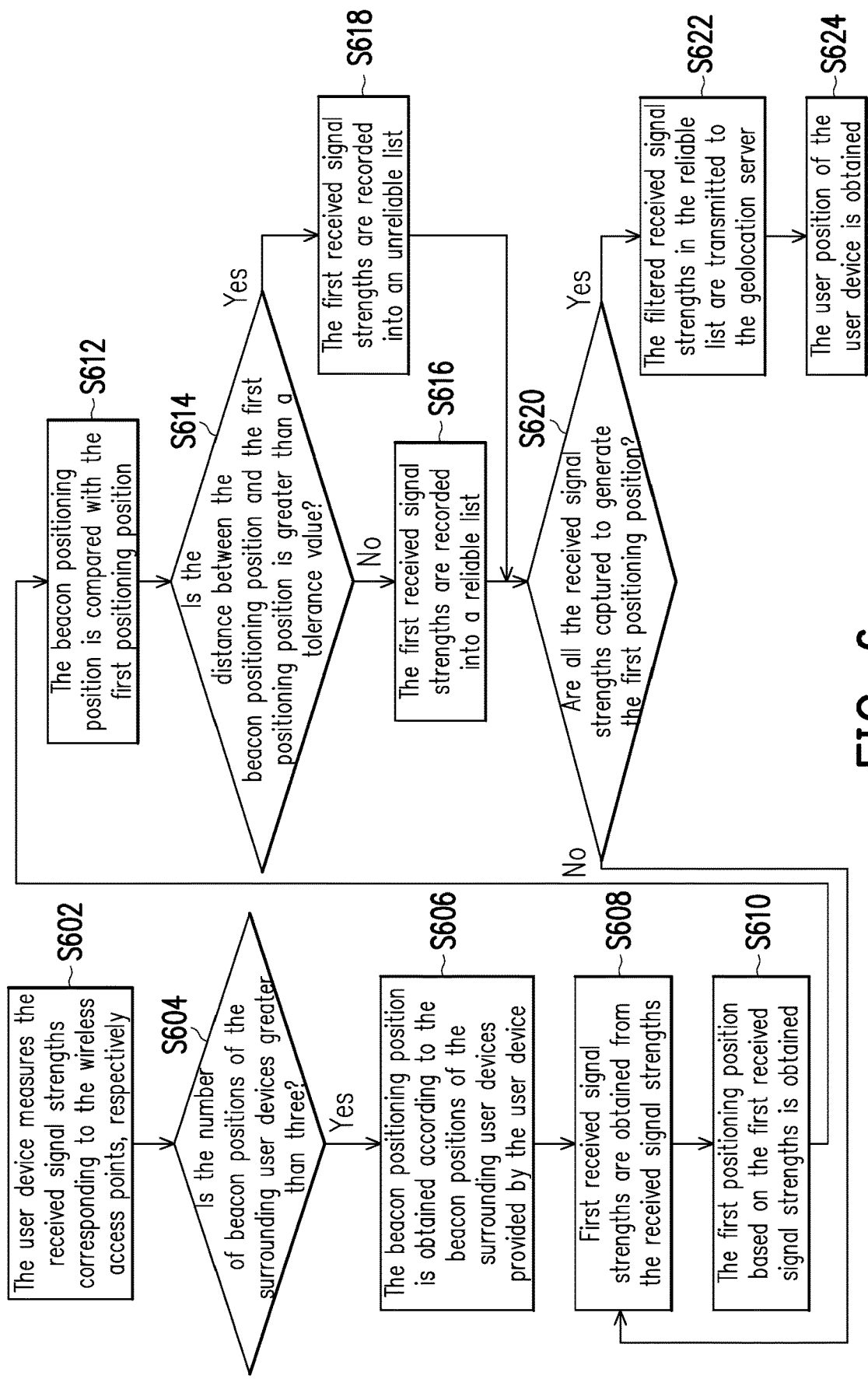
FIG. 6 is a flowchart of a method for wireless positioning according to an embodiment of the disclosure.

FIG. 6 is a flowchart of a method for wireless positioning according to an embodiment of the disclosure. Referring to FIG. 6, in the embodiment of FIG. 6, it is further illustrated that the positioning reference information includes multiple beacon positions of multiple surrounding user devices and the reference positioning positions are beacon positioning positions.

Note that in the embodiment, the user device 110 and the surrounding user devices support the same wireless personal area network standard, such as the Bluetooth Low Energy standard. In other words, both the user device 110 and the surrounding user devices are equipped with communication elements that support the Bluetooth Low Energy standard, such as antennas and transceivers that support the Bluetooth Low Energy standard. The user position and user identification code (ID) of the user device 110 may be broadcasted through a Bluetooth signal. In addition, the user device 110 may also search for the Bluetooth signals sent by the surrounding user devices to obtain the user positions (i.e., beacon positions) and user IDs respectively reported by the surrounding user devices. In addition, the user device 110 may also perform signal measurement on the Bluetooth signals sent by the surrounding user devices to obtain multiple second received signal strengths corresponding to the multiple surrounding user devices. Therefore, the user device 110 may transmit the beacon positions of the surrounding user devices and the corresponding second received signal strengths to the server device 130.

In step S602, the user device 110 measures the received signal strengths corresponding to the wireless access points, respectively. In addition, the user device 110 may search for multiple beacon positions wirelessly reported by multiple surrounding user devices.

In step S604, the server device 130 determines whether the number of beacon positions of the surrounding user devices is greater than three. Specifically, if the number of beacon positions of the surrounding user devices is less than 3, the server device 130 cannot perform triangulation according to the beacon positions.

If it is determined as "No" in step S604, it means that the server device 130 cannot verify the received signal strength of the WiFi signal according to the beacon positions of the surrounding user devices. Thus, the server device 130 may transmit the unfiltered received signal strength to the geolocation server 120 to generate the user position. If it is determined as "Yes" in step S604, proceed to step S606. In step S606, the server device 130 obtains the beacon positioning position according to the beacon positions of the surrounding user devices provided by the user device 110.

In one embodiment, the positioning reference information includes multiple beacon positions of multiple surrounding user devices and multiple second received signal strengths corresponding to the multiple surrounding user devices, respectively. Specifically, the user device 110 searches for multiple beacon positions wirelessly reported by multiple surrounding user devices. The second received signal strengths corresponding to the surrounding user devices respectively are measured by the user device 110. The server device 130 may obtain the beacon positioning position by the triangulation method according to the multiple beacon positions and the multiple second received signal strengths. In addition, in one embodiment, the user device 110 or the server device 130 may further filter out some beacon positions according to the estimated distance between the surrounding user devices and the user device 110 to reduce the error of the beacon positioning positions.

Figure 7:
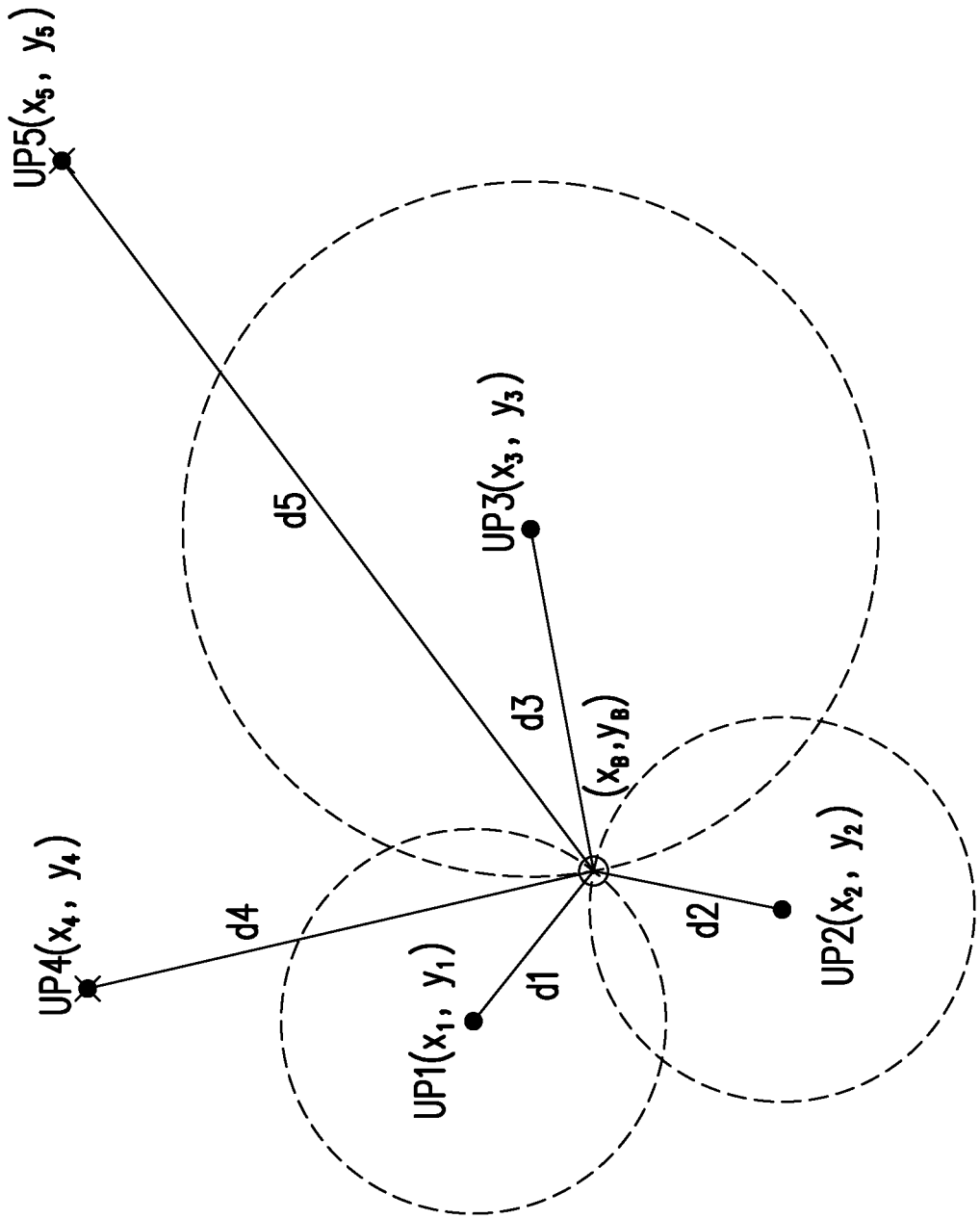
FIG. 7 is a schematic view illustrating how to determine a beacon positioning position according to beacon positions of surrounding user devices according to an embodiment of the disclosure.

FIG. 7 is a schematic view illustrating how to determine a beacon positioning position according to beacon positions of surrounding user devices according to an embodiment of the disclosure. Referring to FIG. 7, the user device 110 may search for multiple beacon positions (x1, y1), (x2, y2), (x3, y3), (x4, y4), (x5, y5) wirelessly reported by multiple surrounding user devices UP1-UP5. The user device 110 measures multiple second received signal strengths corresponding to the surrounding user devices UP1-UP5, respectively. The user device 110 may calculate multiple distances d1-d2 between the user device 110 and the surrounding user devices UP1-UP5 according to the second received signal strengths of the surrounding user devices UP1-UP5. According to whether the distances d1-d2 are greater than the threshold, the user device 110 may filter out some of the beacon positions (x1, y1), (x2, y2), (x3, y3). In other words, the beacon positions of the surrounding user devices UP4-UP5 that are far away may not be filtered to generate the beacon positioning position of the user device 110. Therefore, the server device 130 may obtain beacon positioning position (xB, yB) by the triangulation method according to the filtered some of the beacon positions (x1, y1), (x2, y2), (x3, y3) and some of the second received signal strengths.

In step S608, the server device 130 obtains multiple first received signal strengths from the multiple received signal strengths. In step S610, the server device 130 obtains the first positioning position based on the multiple first received signal strengths. In step S612, the server device 130 compares the beacon positioning position with the first positioning position. In step S614, the server device 130 determines whether the distance between the beacon positioning position and the first positioning position is greater than the tolerance value. If it is determined as "Yes" in step S614, proceed to step S616. In step S616, the server device 130 records the first received signal strengths into the reliable list. If it is determined as "No" in step S614, proceed to step S618. In step S618, the server device 130 records the first received signal strengths into the unreliable list.

In step S620, the server device 130 determines whether all the received signal strengths are captured to generate the first positioning position. If it is determined as "No" in step S620, return to step S608. If it is determined as "Yes" in step S620, proceed to step S622. In step S622, the server device 130 transmits the filtered received signal strength in the reliable list to the geolocation server 120. In step S624, the server device 130 may obtain the user position of the user device 110 from the geolocation server 120. The detailed implementations of steps S608 to S624 are similar to those in the foregoing embodiments, which are not repeated herein.

Note that, in some embodiments, the server device 130 may simultaneously verify the reliability of the received signal strengths of the multiple wireless access points according to the inertial sensing information and the beacon positions provided by the surrounding user devices 110. Several embodiments are illustrated as examples in the subsequent paragraphs.

Figure 8A:
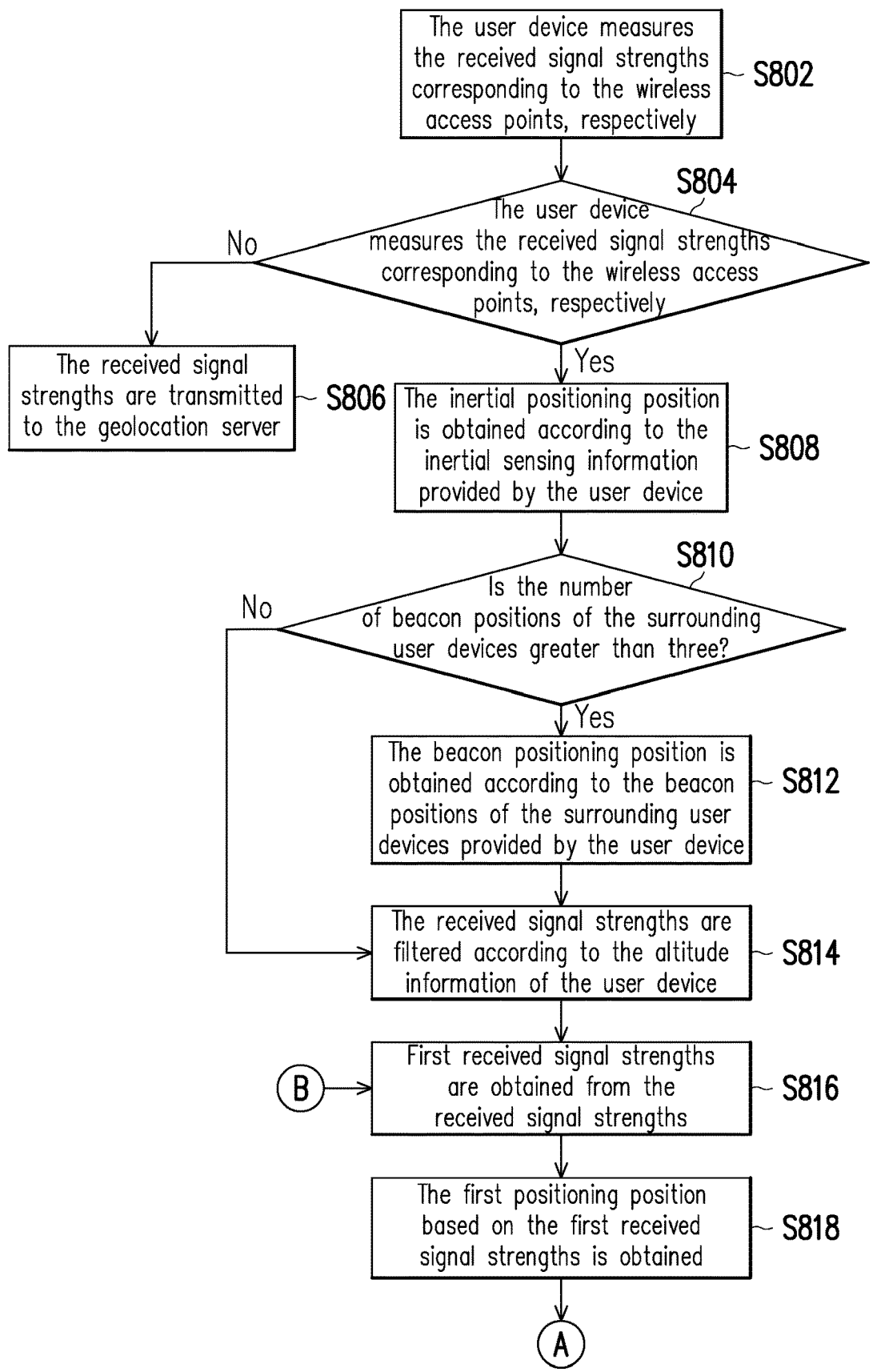
FIG. 8A to FIG. 8C are flowcharts of a method for wireless positioning according to an embodiment of the disclosure.
Figure 8B:
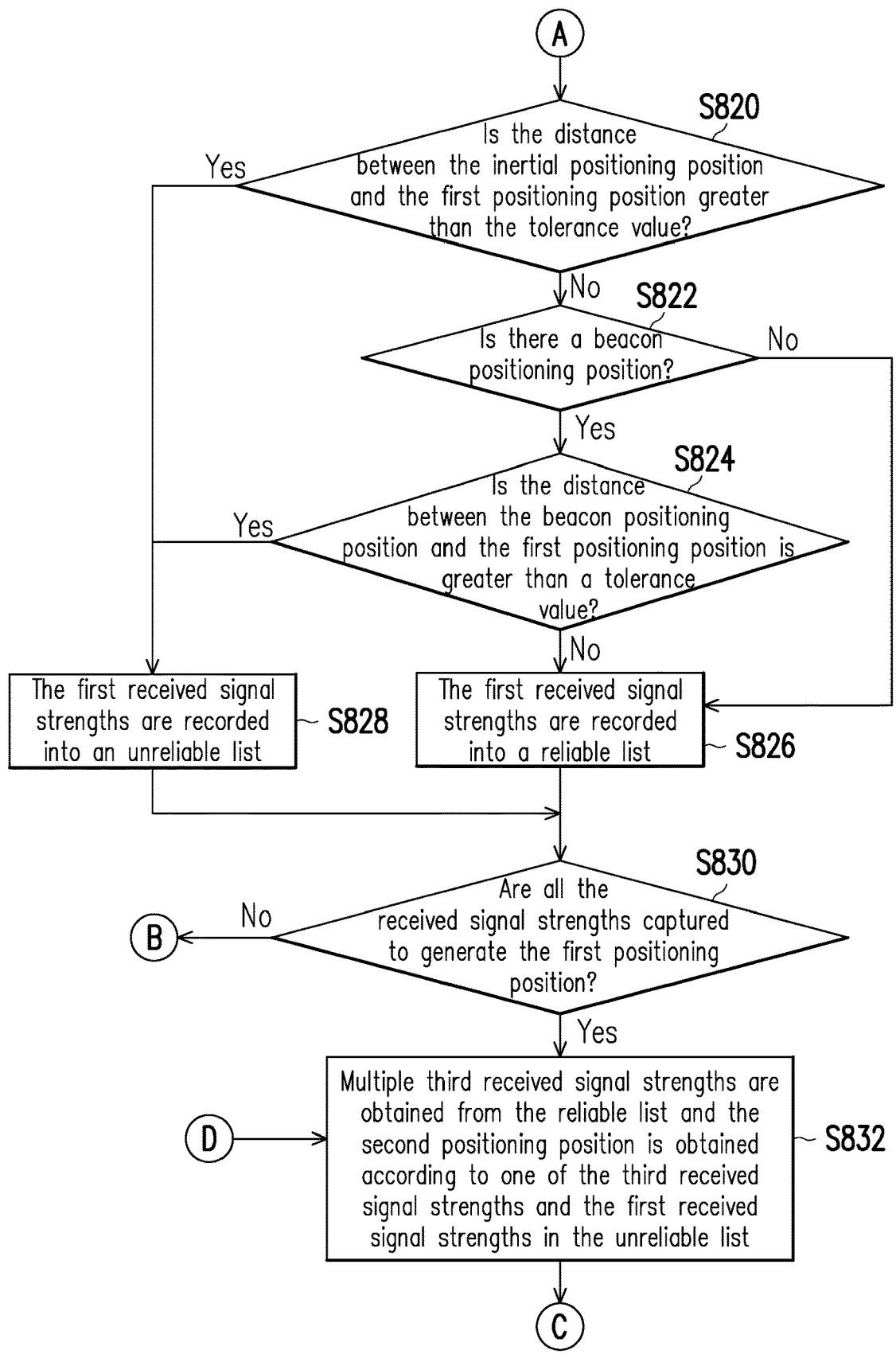
Figure 8C:
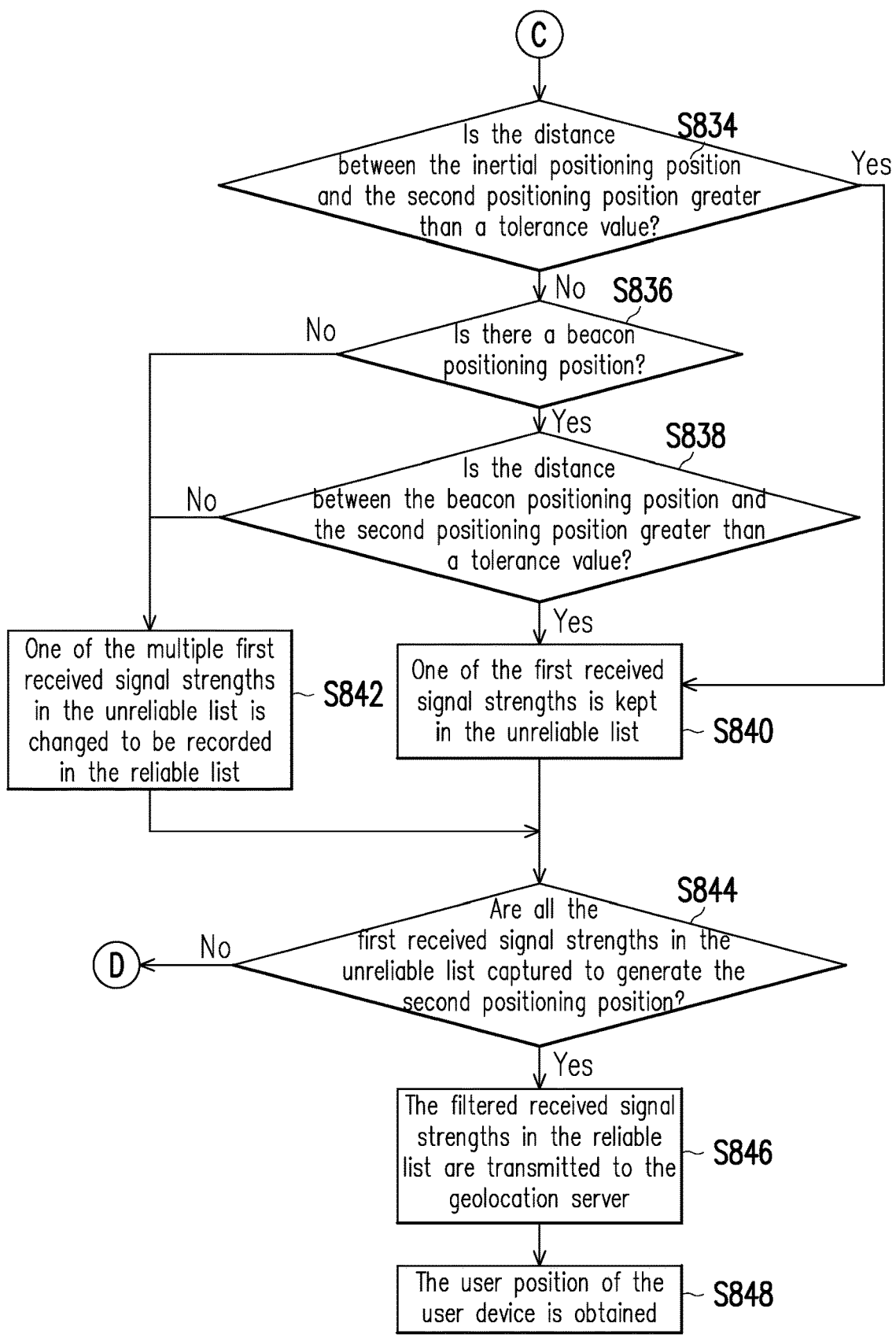

FIG. 8A to FIG. 8C are flowcharts of a method for wireless positioning according to an embodiment of the disclosure. Referring to FIG. 8A and FIG. 8B, in step S802, the user device 110 measures multiple received signal strengths corresponding to the multiple wireless access points, respectively. In step S804, the server device 130 determines whether the user device 110 provides inertial sensing information. If it is determined as "No" in step S804, proceed to step S806. In step S806, the server device 130 transmits multiple unfiltered received signal strengths to the geolocation server 120 to obtain the user position from the geolocation server 120.

If it is determined as "Yes" in step S804, proceed to step S808. In step S808, the server device 130 obtains the inertial positioning position according to the inertial sensing information provided by the user device 110. In step S810, the server device 130 determines whether the number of beacon positions of the surrounding user devices 110 is greater than three. If it is determined as "Yes" in step S810, proceed to step S812. In step S812, the server device 130 obtains the beacon positioning position according to the beacon positions of the surrounding user devices provided by the user device 110. If it is determined as "No" in step S810, proceed to step S814.

In step S814, the server device 130 filters the multiple received signal strengths according to the altitude information of the user device 110. In detail, the user device 110 may include a barometric pressure sensor or other altitude sensors. The user device 110 may transmit the sensed altitude information to the server device 130, and the server device 130 obtains the altitude information of the user device 110. Then, the server device 130 may filter the received signal strengths according to the altitude information of the user device 110. Specifically, the server device 130 may compare the detected floors of the wireless access points and the altitude information of the user device 110 to filter out the received signal strength of the wireless access points located on different floors from the user device 110.

In step S816, the server device 130 obtains multiple first received signal strengths from the multiple received signal strengths. In step S818, the server device 130 obtains the first positioning position based on the multiple first received signal strengths. In step S820, the server device 130 determines whether the distance between the inertial positioning position and the first positioning position is greater than the tolerance value. If it is determined as "No" in step S820, proceeds to step S822. In step S822, the server device 130 determines whether there is a beacon positioning position. If it is determined as "Yes" in step S822, proceed to step S824. In step S824, the server device 130 determines whether the distance between the beacon positioning position and the first positioning position is greater than the tolerance value.

If it is determined as "No" in step S822 or step S824, proceed to step S826. In step S826, the server device 130 records multiple first received signal strengths into the reliable list. If it is determined as "Yes" in step S820 or step S824, proceed to step S828. In step S828, the server device 130 records multiple first received signal strengths into the unreliable list.

Next, in step S830, the server device 130 determines whether all the received signal strengths are captured to generate the first positioning position. If it is determined as "No" in step S830, return to step S816. If it is determined as "Yes" in step S830, proceed to step S832. In step S832, the server device 130 obtains multiple third received signal strengths from the reliable list and obtains the second positioning position according to one of the multiple third received signal strengths and the multiple first received signal strengths in the unreliable list.

In step S834, the server device 130 determines whether the distance between the inertial positioning position and the second positioning position is greater than the tolerance value. If it is determined as "No" in step S834, proceed to step S836. In step S836, the server device 130 determines whether there is a beacon positioning position. If it is determined as "Yes" in step S836, proceed to step S838. In step S838, the server device 130 determines whether the distance between the beacon positioning position and the second positioning position is greater than the tolerance value.

If it is determined as "Yes" in step S834 or S838, proceed to step S840. In step S840, the server device 130 keeps one of the multiple first received signal strengths in the unreliable list. If it is determined as "No" in step S836 or step S838, proceed to step S842. In step S842, the server device 130 changes one of the multiple first received signal strengths in the unreliable list to be recorded in the reliable list.

In step S844, the server device 130 determines whether all the first received signal strengths in the unreliable list are captured to generate the second positioning position. If it is determined as "No" in step S844, return to step S832. If it is determined as "Yes" in step S844, proceed to step S846. In step S846, the server device 130 transmits the filtered received signal strengths in the reliable list to the geolocation server 120. In step S848, the server device 130 obtains the user position of the user device 110.

In one embodiment, the server device 130 may further perform a personnel control function on the user position of the user device 110. The server device 130 may establish a geographic fence. In response to the user position being within the geographic fence, the server device 130 may perform a personnel check-in function or an alert function. In one embodiment, the server device 130 may implement a patient monitoring function according to the user position of the user device 110 and the geographic fence corresponding to a medical place. In one embodiment, the server device 130 may implement the automatic check-in function of the conference participants according to the user position of the user device 110 and the geographic fence corresponding to the conference venue. In the subsequent paragraphs, one embodiment is illustrated as an example for clarity.

Figure 9:
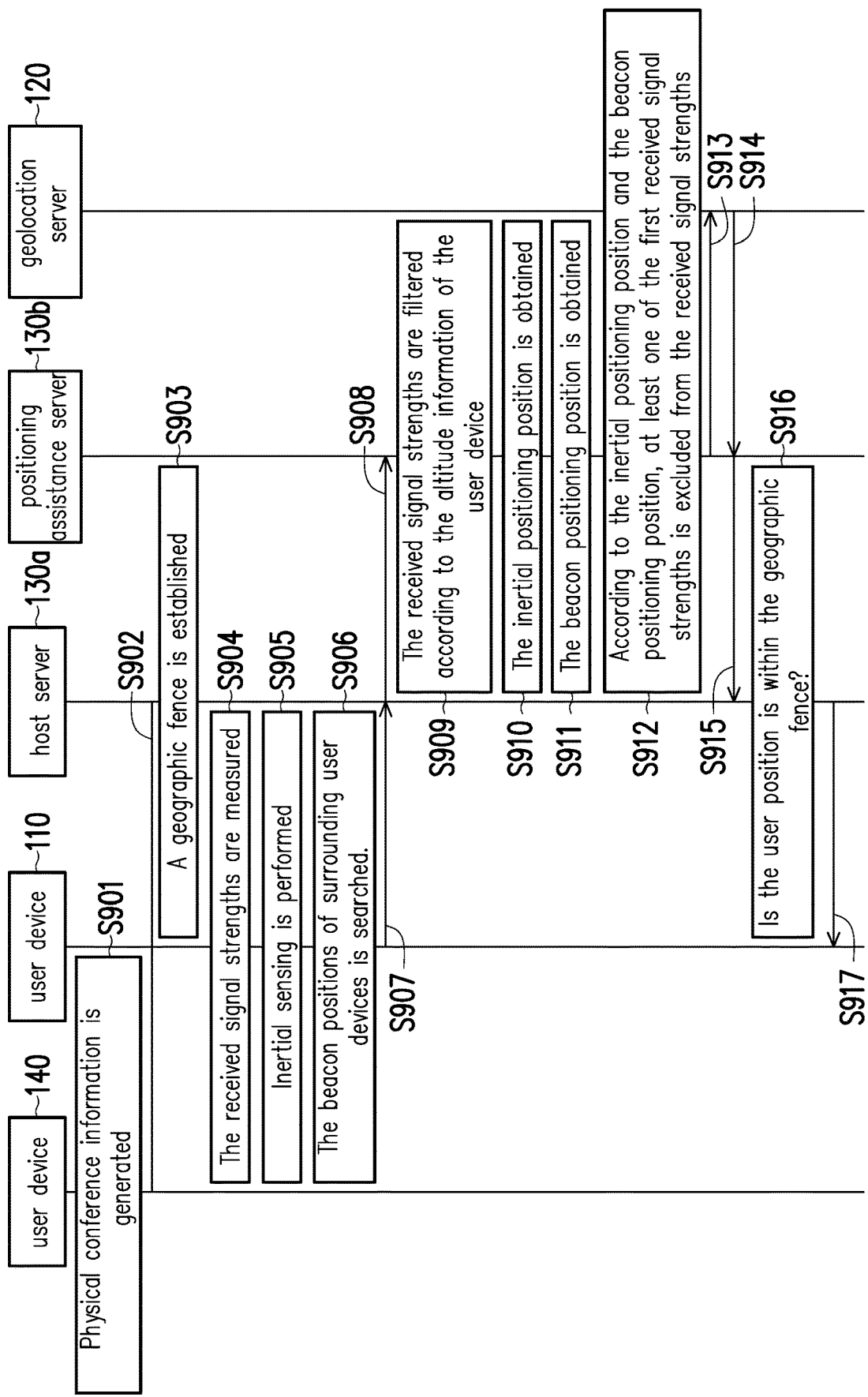
FIG. 9 is a flowchart of an application scenario of a method for wireless positioning according to an embodiment of the disclosure.

FIG. 9 is a flowchart of an application scenario of a method for wireless positioning according to an embodiment of the disclosure. Referring to FIG. 9, in the embodiment, the server device 130 may be implemented by a host server 130a and a positioning assistance server 130b.

In step S901, a user device 140 of the administrator may generate physical conference information. Specifically, the physical conference information may include conference time and conference venue information, and so on. In step S902, the user device 140 may transmit the physical conference information to the host server 130a. In step S903, the host server 130a may establish a geographic fence according to the conference venue information in the physical conference information. The fence boundary of the geographic fence may be polygonal or circular.

In step S904, the user device 110 of the conference participant may measure the received signal strengths corresponding to the multiple wireless access points, respectively. In step S905, the user device 110 may use the inertial sensor to perform inertial sensing to obtain inertial sensing information. In step S906, the user device 110 may search for beacon positions of surrounding user devices.

In step S907, the user device 110 may provide the host server 130a with the position information about its own position. The position information may include GPS position, altitude information, inertial sensing information, beacon positions of surrounding user devices and corresponding second received signal strengths, multiple received signal strengths and MAC addresses corresponding to multiple wireless access points, and mobile communication base station information, and so on. In step S908, the host server 130a may transmit the position information of the user device 110 to the positioning assistance server 130b.

In step S909, the positioning assistance server 130b may filter the received signal strengths according to the altitude information of the user device 110. In step S910, the positioning assistance server 130b may obtain an inertial positioning position according to the inertial sensing information provided by the user device 110. In step S911, the positioning assistance server 130b may obtain a beacon positioning position according to the beacon position provided by the user device 110.

In step S912, according to the inertial positioning position and the beacon positioning position, the positioning assistance server 130b may exclude at least one of the multiple first received signal strengths from the multiple received signal strengths through the positioning function provided by the geolocation server 120.

In step S913, the positioning assistance server 130b transmits the filtered received signal strengths in the reliable list to the geolocation server 120. In step S914, the geolocation server 120 may generate the user position according to the filtered received signal strengths and return the user position to the positioning assistance server 130b. In step S915, the positioning assistance server 130b transmits the user position to the host server 130a.

In step S916, the host server 130a determines whether the user position is within the geographic fence. In one embodiment, the host server 130a may create rays in the axial direction according to the coordinate components of the user position. Then, the host server 130a may determine whether the user position is within the geographic fence or outside the geographic fence according to the number of intersections between the ray and the fence boundary of the geographic fence. If the number of intersections between the ray and the fence boundary of the geographic fence is an odd number, it may be determined that the user position is within the geographic fence.

Figure 10A:
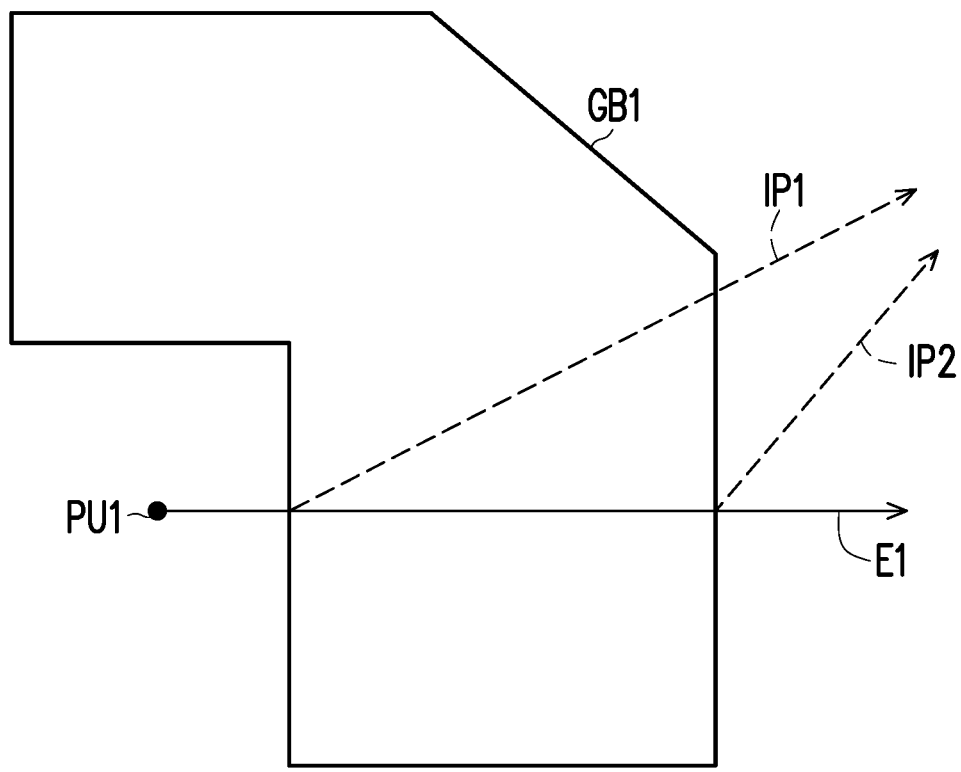
FIG. 10A and FIG. 10B are schematic views illustrating how to determine whether a device is located within a geographic fence according to an embodiment of the disclosure.
Figure 10B:
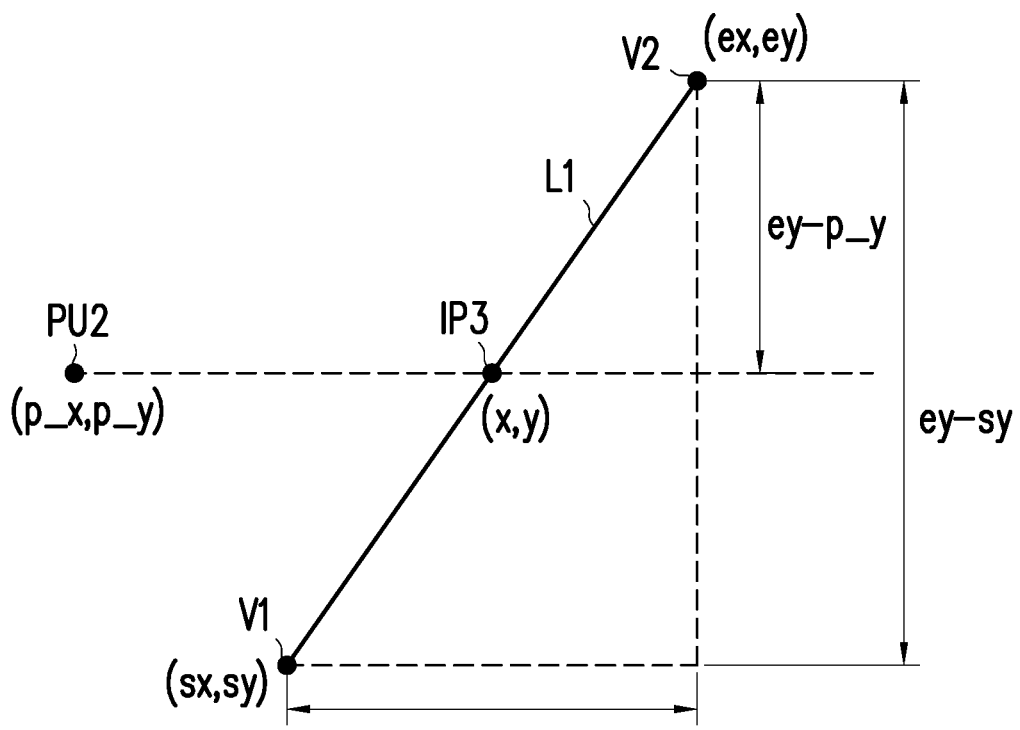

For example, referring to FIG. 10A and FIG. 10B, FIG. 10A and FIG. 10B are schematic views illustrating how to determine whether a device is located within a geographic fence according to an embodiment of the disclosure. As shown in FIG. 10A, the host server 130a may create a ray E1 in the +X-axis direction according to the Y-coordinate component of a user position PU1. The ray E1 intersects a fence boundary GB1 of the geographic fence at intersection points IP1, IP2. In response to the fact that the number (two) of intersections between the ray E1 and the geographic fence boundary GB1 is an even number, the host server 130a may determine that the user position PU1 is outside the geographic fence.

In addition, referring to FIG. 10B, the host server 130a may obtain a straight line L1 according to the coordinate positions (ex, ey) and (sx, sy) of the vertices V1 and V2 of the fence boundary. The host server 130a may obtain the coordinate position (x, y) of the intersection IP3 by substituting the Y-coordinate component of the user position (p_x, p_y) into the straight line equation of the straight line L1. Therefore, the host server 130a may determine whether the X-coordinate component of the intersection IP3 is between the X-coordinate component ex of the vertex V1 and the X-coordinate component sx of the vertex V2. If the X-coordinate component of the intersection IP3 is between the X-coordinate component ex of the vertex V1 and the X-coordinate component sx of the vertex V2, it means that the intersection IP3 is the intersection of the ray and the fence boundary of the geographic fence.

In step S917, in response to the user position 110 being within the geographic fence, the host server 130a executes a personnel check-in function or an alert function. For example, the host server 130a may determine whether the user of the user device 110 is a conference participant according to the user ID provided by the user device 110. If the user of the user device 110 is a conference participant, in response to the user position 110 being within the geographic fence, the host server 130a executes a personnel check-in function and provides an already check-in message to the user device 110 or the user device 140. Otherwise, if the user of the user device 110 is not a conference participant, in response to the user position 110 being within the geographic fence, the host server 130a executes an alert function and provides the user device 110 or the user device 140 with an alert message. Accordingly, the verification and confirmation of conference participants require no manual work, which may greatly facilitate the workload of conference personnel management.

In summary, in the embodiments of the disclosure, the received signal strengths corresponding to the multiple wireless access points may be verified based on the reference positioning information provided by the user device. Unreliable received signal strengths may be excluded, and the geolocation server may generate the user position according to filtered received signal strengths. Accordingly, the positioning accuracy may be improved. In addition, by determining whether the user position is within the geographic fence, the server device of the embodiments of the disclosure may automatically determine whether qualified conference participants have arrived at the conference venue, which may greatly facilitate the conference check-in procedure.

Although the disclosure has been described with reference to the above embodiments, they are not intended to limit the disclosure. It will be apparent to one of ordinary skill in the art that modifications and changes to the described embodiments may be made without departing from the spirit and the scope of the disclosure. Accordingly, the scope of the disclosure will be defined by the attached claims and their equivalents and not by the above detailed descriptions.

What is claimed is:

1. A method for wireless positioning, comprising:
measuring a plurality of received signal strengths corresponding to a plurality of wireless access points, respectively, by a user device, wherein the received signal strengths comprise a plurality of first received signal strengths;
obtaining a reference positioning position according to positioning reference information comprising inertial sensing information provided by the user device, further comprising:
sensing the inertial sensing information by the user device; and
performing an inertial positioning according to the inertial sensing information and an initial position of the user device for obtaining an inertial positioning position;
obtaining a first positioning position based on the first received signal strengths;
comparing the reference positioning position with the first positioning position;
in response to a distance between the reference positioning position and the first positioning position being greater than a tolerance value, excluding at least one of the first received signal strengths from the received signal strengths for obtaining a plurality of filtered received signal strengths of the received signal strengths;
obtaining a user position of the user device according to the filtered received signal strengths; and
in response to all the received signal strengths being excluded based on the inertial positioning position, the first positioning position is used as the user position of the user device.

2. The method for wireless positioning of claim 1, wherein the positioning reference information comprises a plurality of beacon positions of a plurality of surrounding user devices and a plurality of second received signal strengths corresponding to the surrounding user devices, respectively, and the step of obtaining the reference positioning position according to the positioning reference information provided by the user device comprises:
searching the beacon positions wirelessly reported by the surrounding user devices, by the user device;
measuring the second received signal strengths corresponding to the surrounding user devices respectively by the user device; and
according to the beacon positions and the second received signal strengths, obtaining a beacon positioning position by a triangulation method.

3. The method for wireless positioning of claim 2, wherein the step of obtaining the reference positioning position according to the positioning reference information provided by the user device comprises:
calculating a plurality of distances between the user device and the surrounding user devices according to the second received signal strengths of the surrounding user devices; and
filtering some of the beacon positions according to the distances between the user device and the surrounding user devices,
wherein according to the beacon positions and the second received signal strengths, the step of obtaining the reference positioning position by the triangulation method comprises:
according to the filtered some of the beacon positions and some of the second received signal strengths, obtaining the beacon positioning position by the triangulation method.

4. The method for wireless positioning of claim 1, wherein the step of in response to the distance between the reference positioning position and the first positioning position being greater than the tolerance value, excluding at least one of the first received signal strengths from the received signal strengths for obtaining the filtered received signal strengths of the received signal strengths comprises:
in response to the distance between the reference positioning position and the first positioning position being greater than the tolerance value, recording the first received signal strengths to an unreliable list;
obtaining a plurality of third received signal strengths from a reliable list, and obtaining a second positioning position according to one of the first received signal strengths and the third received signal strengths;
in response to the distance between the reference positioning position and a second positioning position being greater than the tolerance value, keeping one of the first received signal strengths in the unreliable list for excluding one of the first received signal strengths from the received signal strengths; and
in response to the distance between the reference positioning position and the second positioning position being less than the tolerance value, changing one of the first received signal strengths from being recorded in the unreliable list to being recorded in the reliable list, wherein the reliable list is used for recording the filtered received signal strengths.

5. The method for wireless positioning of claim 1, further comprising:
in response to a distance between the reference positioning position and the first positioning position being less than the tolerance value, recording the first received signal strengths into a reliable list, wherein the reliable list is used for recording all the filtered received signal strengths.

6. The method for wireless positioning of claim 1, further comprising:
establishing a geographic fence; and
in response to the user position being within the geographic fence, performing a check-in function or an alert function.

7. The method for wireless positioning of claim 6, wherein a fence boundary of the geographic fence is polygonal, and the method further comprises:
establishing a ray in an axial direction according to a coordinate component of the user position; and
according to a number of intersections between the ray and the fence boundary of the geographic fence, determining whether the user position is inside the geographic fence or outside the geographic fence.

8. The method for wireless positioning of claim 1, further comprising:
obtaining altitude information of the user device; and
filtering the received signal strengths according to the altitude information of the user device.

9. A system for wireless positioning, comprising:
a user device measuring a plurality of received signal strengths corresponding to a plurality of wireless access points, respectively, wherein the received signal strengths comprise a plurality of first received signal strengths;

a geolocation server; and a server device connecting the user device and the geolocation server, wherein the server device:

obtains a reference positioning position according to positioning reference information provided by the user device, wherein the positioning reference information comprises inertial sensing information, the user device senses the inertial sensing information;

performs inertial positioning according to the inertial sensing information and an initial position of the user device for obtaining an inertial positioning position;

obtains a first positioning position based on the first received signal strengths;

compares the reference positioning position with the first positioning position;

in response to a distance between the reference positioning position and the first positioning position being greater than a tolerance value, excluding at least one of the first received signal strengths from the received signal strengths for obtaining a plurality of filtered received signal strengths of the received signal strengths;

obtains a user position of the user device through the geolocation server according to the filtered received signal strengths; and in response to all the received signal strengths being excluded based on the inertial positioning position, uses the first positioning position as the user position of the user device.

10. The system for wireless positioning of claim 9, wherein the positioning reference information comprises a plurality of beacon positions of a plurality of surrounding user devices and a plurality of second received signal strengths respectively corresponding to the surrounding user devices, the user device searches for the beacon positions wirelessly reported by the surrounding user devices, the user device measures the second received signal strengths corresponding to the surrounding user devices, respectively, and the server device obtains a beacon positioning position by a triangulation method according to the beacon positions and the second received signal strengths.

11. The system for wireless positioning of claim 10, wherein the server device calculates a plurality of distances between the user device and the surrounding user devices according to the second received signal strengths of the surrounding user devices, the server device filters some of the beacon positions according to the distances between the user device and the surrounding user devices, wherein the server device obtains the beacon positioning position by using the triangulation method according to the filtered some of the beacon positions and the some of the second received signal strengths.

12. The system for wireless positioning of claim 9, wherein in response to the distance between the reference positioning position and the first positioning position being greater than the tolerance value, the server device records the first received signal strengths into an unreliable list; the server device obtains a plurality of third received signal strengths from a reliable list and obtains a second positioning position according to one of the first received signal strengths and the third received signal strengths; in response to the distance between the reference positioning position and the second positioning position being greater than the tolerance value, the server device keeps one of the first received signal strengths in the unreliable list for excluding one of the first received signal strengths from the received signal strengths; and in response to the distance between the reference positioning position and the second positioning position being less than the tolerance value, the server device changes one of the first received signal strengths from being recorded in the unreliable list to being recorded in the reliable list, wherein the reliable list is used to record the filtered received signal strengths.

13. The system for wireless positioning of claim 9, wherein in response to the distance between the reference positioning position and the first positioning position being less than the tolerance value, the server device records the first received signal strengths into a reliable list, wherein the reliable list is used to record the filtered received signal strengths.

14. The system for wireless positioning of claim 9, wherein the server device establishes a geographic fence, and in response to the user position being within the geographic fence, the server device executes a personnel check-in function or an alert function.

15. The system for wireless positioning of claim 14, wherein a fence boundary of the geographic fence is polygonal, and the server device establishes a ray in an axial direction according to a coordinate component of the user position and determines whether the user position is located inside the geographic fence or outside the geographic fence according to a number of intersections between the ray and the fence boundary of the geographic fence.

16. The system for wireless positioning of claim 9, wherein the server device obtains altitude information of the user device and filters the received signal strengths according to the altitude information of the user device.

* * * * *